United States Patent [19]
Vavalidis et al.

[11] Patent Number: 5,387,006
[45] Date of Patent: Feb. 7, 1995

[54] AIR BAG ARMING DEVICE INCLUDING STEERING SHAFT ROTATION SENSOR

[75] Inventors: Kyriakos Vavalidis, Ferrieres en Bray; Denis Bourcart, Gournay-en-Bray, both of France; Thomas Gornig, Dachau, Germany

[73] Assignee: Autoliv Klippan S.N.C., Paris, France

[21] Appl. No.: 43,528

[22] Filed: Apr. 6, 1993

[30] Foreign Application Priority Data

Apr. 10, 1992 [FR] France .................. 92 04423

[51] Int. Cl.$^6$ .................................................. B60R 21/16
[52] U.S. Cl. ..................................... 280/731; 280/735
[58] Field of Search ............. 280/735, 728 R, 731; 307/10.1

[56] References Cited

U.S. PATENT DOCUMENTS 4,055,375 10/1977 Ogawa et al. .
4,059,822 11/1977 Toshioka ............................ 280/735
4,366,465 12/1982 Veneziano ......................... 280/735
4,974,873 12/1990 Kaiguchi et al. .
5,170,066 12/1992 Huber ............................... 280/735

FOREIGN PATENT DOCUMENTS 2463028 2/1981 France .
2582269 11/1986 France .
3436377 6/1986 Germany .

Primary Examiner—Karin L. Tyson
Attorney, Agent, or Firm—Young & Thompson

[57] ABSTRACT

The inflatable safety cushion for a vehicle comprises an electric arming device (19) which is capable of detecting a dangerous situation and of very rapidly actuating a pyrotechnic gas generator for triggering said safety cushion, and which is powered by a cell (12). It also comprises an arming device (20, 21) for detecting that the vehicle is being used in order automatically to arm the device (19) as soon as it is detected that the vehicle is being used, and a device (21a) for interrupting the armed state as soon as, for a predetermined length of time, no use of the vehicle has been detected.

14 Claims, 2 Drawing Sheets

AIR BAG ARMING DEVICE INCLUDING STEERING SHAFT ROTATION SENSOR

The present invention relates to an inflatable safety cushion for a motor vehicle, commonly called an airbag, which may in particular be housed in the steering wheel for protecting the driver of said vehicle, comprising an electrical arming device capable of detecting a danger situation and of very rapidly actuating a pyrotechnic member for triggering said safety cushion.

FR-A-2,582,269 discloses an appliance for triggering a member for tightening a seatbelt. This appliance comprises an electric arming device, capable of detecting a danger situation and of very rapidly actuating a pyrotechnic gas generator for triggering said tightening member. This device comprises a circuit powered by a cell and comprises, mounted in series, at least one sensor able to close said circuit when the danger situation is detected, and an electric ignitor capable of being fired in order to actuate the pyrotechnic gas generator under the action of the electrical current which flows in the circuit as soon as the sensor closes said circuit, the cell, the sensor and the ignitor being concentrated at the same place and being connected by a very short circuit.

In order to save the energy stored by the cell, this device comprises a stop/start switch which is a magnetic strip-type relay capable of detecting the passage of a magnetic tape woven into the strap of the belt. This switch turns on the device when the seatbelt is unrolled by a user of the vehicle, and switches it off again when the belt is released by said user and is wound back up on the winder.

Such a device cannot equip an airbag.

The object of the invention is to propose an airbag of the aforementioned type equipped with an electric arming device powered by a cell, this device being entirely autonomously capable of being housed entirely inside the steering wheel of a vehicle, whilst being perfectly reliable, secure and capable of protecting the corresponding passenger of a vehicle effectively under all the conditions of use of said vehicle.

The inflatable safety cushion or bag envisaged by the invention comprises an electric arming device of the aforementioned type.

According to the invention, this safety cushion is one wherein it comprises arming means for detecting a use of the vehicle in order automatically to arm said device as soon as it is detected that said vehicle is being used, and means for interrupting the armed state as soon as, for a predetermined length of time, no use of the vehicle has been detected.

The advantage of the Applicant Company is to have analyzed the conditions of use of a vehicle and to have discovered that it is sufficient, for an airbag of the abovementioned type, to associate, in combination, means for detecting a use of the vehicle, and time-delay means for keeping the arming device operational during a period of predetermined length after a last signal of use of the vehicle: this device thus remains operational in specific conditions under which it is difficult to detect the use of a vehicle whilst there still remains a risk of danger, for example while stopping in front of a traffic light showing the red stop light, in traffic jams, when driving along a dead-straight and perfectly flat road, etc.

It is thus possible to produce an entirely autonomous airbag, capable of being installed on any type of vehicle, even in the case of a steering wheel which does not comprise a revolving contact for supplying the energy from the battery to inside the steering wheel. The airbag in accordance with the invention may operate even in the case of an incident of accident giving rise to the cables providing the distribution of electric current from the battery being cut.

According to an advantageous version of the invention, the arming means comprise a detector of rotation of a revolving shaft.

It is thus easy to switch the arming device on as soon as the steering wheel is turned, at least as far as the airbag intended to protect the driver of the vehicle is concerned.

According to a preferred version of the invention, the arming means comprise at least one magnet and at least one magnetic relay capable of opening or closing by passing in front of the magnet in the case of relative displacement with respect to the magnet(s).

Other features and advantages of the invention will emerge from the detailed description hereafter.

In the appended drawings, given solely by way of non-limiting examples:

Figure 1:
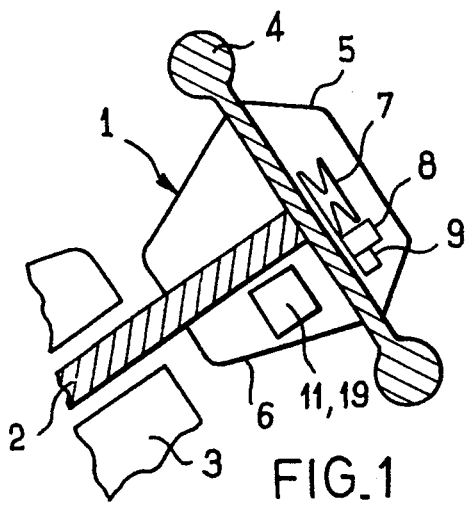
FIG. 1 is a partial diagrammatic view, partially in section, of a steering wheel and of the steering column of a motor vehicle.

In the embodiment of FIG. 1, the assembly of a steering wheel, represented by the reference 1, is fastened to a steering column 2 which turns inside a sheath shown diagrammatically at 3. The assembly of the steering wheel 1 comprises the actual ring 4 which is fitted with an upper lining 5 and a lower lining 6 respectively covering a folded protection airbag 7 ready for use, a pyrotechnic gas generator 8 allowing the airbag 7 to be inflated very rapidly, an electric ignitor 9, an impact sensor 10. All this equipment, of any type, is known per se and it is not necessary to describe it in detail here. The assembly 1 also contains other elements which will be described later.

In a known fashion, the aforementioned equipment constitutes, in combination with other equipment, an electric arming device 11 capable of detecting a danger situation and of very rapidly actuating the pyrotechnic gas generator 8 for inflating the bag 7. This device further comprises, in a known fashion (see FIGS. 2 and 3):

means forming a continuous current source 12, a circuit 14 powered by the source 12 and comprising, mounted in series, the sensor 10 capable of closing said circuit 14 when the danger situation is detected, and the electric ignitor 9 capable of being fired in order to actuate the pyrotechnic gas generator 8 under the action of the electrical current which flows in the circuit 14 as soon as the sensor 10 closes said circuit.

Figure 2:
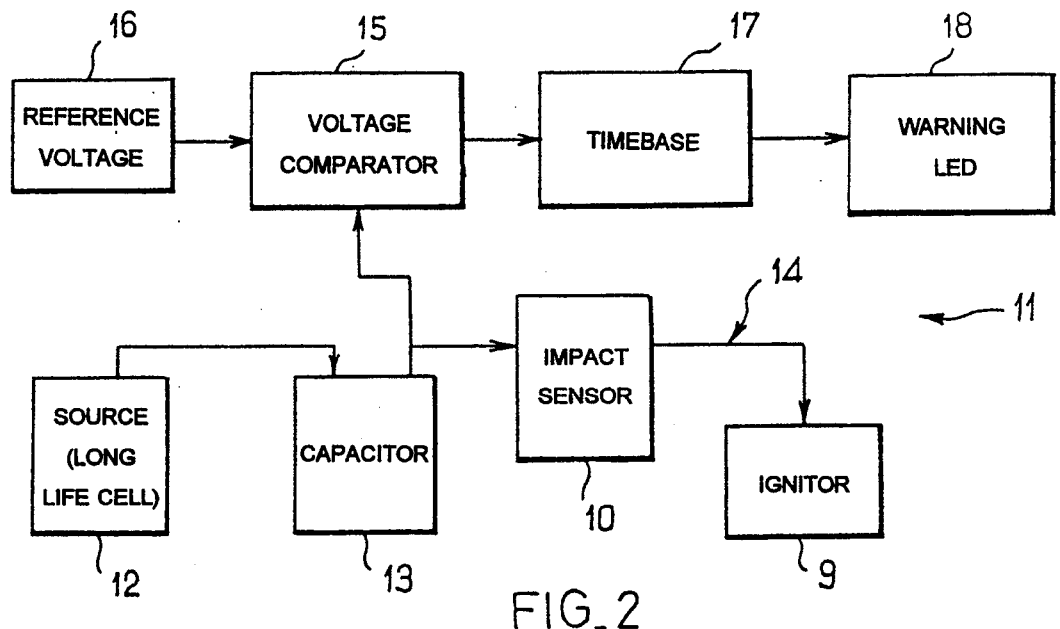
FIG. 2 is a simplified electrical diagram of a first embodiment of the device in accordance with the invention.

In the embodiment shown diagrammatically in FIG. 2:

the source 12 consists of at least one long life cell 12 with low losses capable of supplying a charge of several amp-hours (Ah) under a voltage of a few volts which remains substantially constant during almost the whole life of the cell;

the sensor 10 is a passive impact sensor which does not consume electricity when it is not activated;

a capacitor 13 consists of at least one capacitor with very low impedance and very low leakage current;

the electric ignitor 9 is an ignitor with very low ohmic resistance and very low ignition energy.

The cell 12, the capacitor 13, the sensor 10 and the ignitor 9 are concentrated at the same place in the steering wheel 1 and are connected by a very short circuit of low resistance.

The voltage of the cell 12, the capacitance of the capacitor 13 and the ohmic resistance of the circuit 14 are chosen so that discharging the capacitor 13 causes a current to flow in the circuit 14 for a predetermined time and with a predetermined strength, necessary for firing the ignitor 9, in the event of said circuit being closed by the sensor 10.

The cell 12 is for example a lithium/thionyl chloride cell delivering a voltage of approximately 3.6 volts and capable of supplying energy of approximately 10 Ah. The cell is capable of resisting the temperatures likely to prevail inside the steering wheel, and its voltage remains substantially constant during almost all its life.

The capacitor 13 has an impedance which is advantageously lower than 1 ohm, preferably lower than 0.2 ohm, in the aforementioned temperature range, and a leakage current advantageously less than 5 $\mu$A, preferably less than 2 $\mu$A, in the same temperature range.

The electric ignitor 9 is, for example, capable of being fired under the action of a current whose strength is less than approximately 0.8 A with a minimum duration of approximately 2 ms and preferably under the action of a current of 0.6 A. It requires, for example, to be made to burn, a firing energy lower than approximately 2.2 mJ supplied for approximately 2 ms, and preferably an energy of approximately 1.7 or 1.8 mJ.

The device 11 may be limited to the circuit 14 consisting of the four aforementioned components namely cell 12, capacitor 13, sensor 10 and ignitor 9, connected as shown in FIG. 2, the current being returned, of course, via earth.

Preferably, and as represented diagrammatically in FIG. 2, the device 11 also comprises means for monitoring the voltage of the cell 12, and warning means which are actuated by the monitoring means when the voltage of the cell becomes less than a minimum predetermined threshold.

In a known fashion, the monitoring means comprise a voltage comparator 15 which receives the voltage of the cell 12 and a reference voltage 16. If the voltage of the cell 12 becomes less than the minimum threshold defined by the reference 16, the comparator 15 powers a timebase 17 which causes a warning light-emitting diode (LED) 18 to flash.

Figure 3:
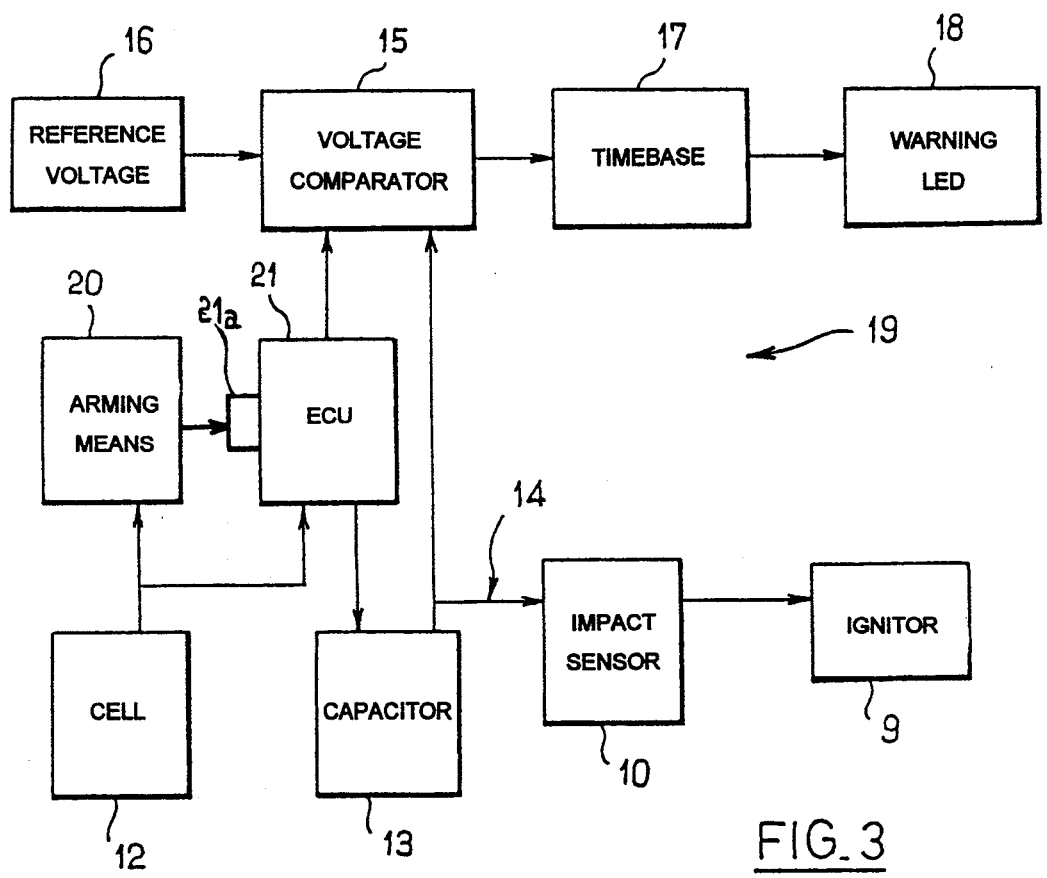
FIG. 3 is a view similar to FIG. 2 of another embodiment of the invention.

In the embodiment shown diagrammatically in FIG. 3, the monitoring device 19 in accordance with the invention comprises all the elements which constitute the device 11 of FIG. 2, and which retain the same reference number.

The device 19 further comprises arming means 20 for detecting that the vehicle is being used in order automatically to arm said device as soon as it is detected that said vehicle is being used, and means for interrupting the armed state as soon as, for a predetermined length of time, no use of the vehicle has been detected.

In the example represented, the arming means comprise a detector 20 of rotation of a revolving shaft, in this case the steering column 2. The function of the detector 20 is to deliver a signal, for example a change of state of a contact signal, or a presence or absence of voltage signal, and the detector is associated with a conventional electronic circuit 21 which it is not necessary to describe here, capable of controlling the arming or, to the contrary, of interrupting the arming of the device 19, by switching said device on or off. The electronic circuit 21 particularly comprises a time-delay device represented diagrammatically at 21a which keeps the device 19 in the armed state for a predetermined time, for example 1 hour, after the last signal of use of the vehicle was received from the detector 20.

The device 19 further comprises, preferably, means for actuating the warning means when the arming means 20, 21 put said device into the armed state: the circuit 21 is thus, for example, connected to the voltage comparator 15 so that the latter actuates the time base 17 and makes the light-emitting diode 18 flash when the device 19 is switched on. Thus, the motorist who is seated in his car and turns his steering wheel 1 is informed, by the flashing of the diode 18, that the device 19 is switched on and in the armed state.

When the circuit 14 is thus switched on, the cell 12 lets out a small current in order to supplement the charge of the capacitor 13 and compensate for losses which have arisen in the latter since the last time the vehicle was used. This light flow from the cell has the great advantage of at least partially eliminating the passivation of the electrodes of the cell 12, so that the latter is permanently in optimum operating conditions.

The arming means may comprise at least one magnet and at least one magnetic relay (Reed bulb) capable of opening or closing by passing in front of the magnet in the case of relative displacement with respect to the magnet(s).

Figure 4:
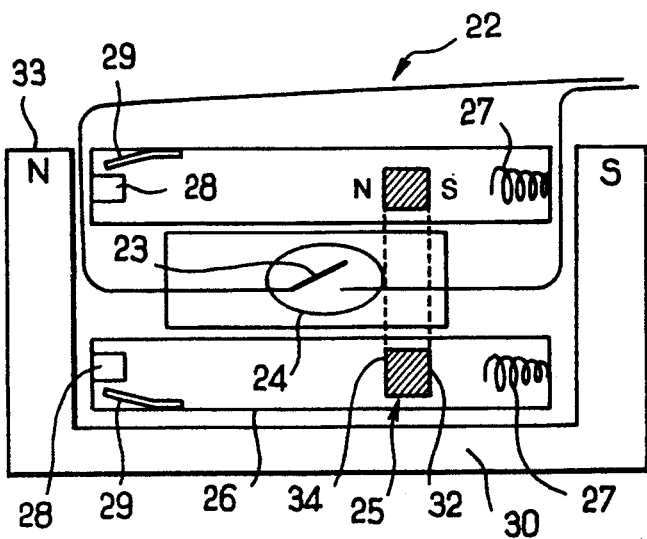
FIG. 4 is a partially sectioned diagram of a first embodiment of a rotation detector in accordance with the invention.

In the embodiment represented diagrammatically in FIG. 4, the rotation detector 22 comprises a flexible strip switch 23 contained in a bulb 24 of cylindrical shape. Around the bulb 24 there is placed a magnet 25 of annular shape which moves freely axially inside an annular housing 26 placed around the bulb 24 and coaxially with respect to the latter.

If the detector 22 is fixed inside the steering wheel 1, for example so that its axis is horizontal when the steering wheel is in its mean position, a rotation in the clockwise direction of the steering wheel 1 will lead to a displacement of the magnet 25 to the right of FIG. 4 with respect to the bulb 24; this displacement of the magnet 25 will take place towards the left of the figure if the steering wheel is turned in the counter-clockwise direction. Each time the magnet 25 passes in line with the flexible strip switch 23, the latter is closed and delivers a change of state signal processed by the electronic circuit 21.

In the example represented, and in order to avoid parasitic signals in the case of rebound of the magnet at the two ends of the housing 26, means are provided for braking the annular magnet 25 at the end of its travel. These means may be of any known type: thus, at the right-hand end of FIG. 4 springs 27 have been represented and at the left-hand end of-the figure elastic masses 28 and flexible braking strips 29 have been represented capable of braking the magnet 25 without blocking it. A U-shaped magnet 30 has also been represented surrounding the annular housing 26 in the longitudinal direction and having its branch 31 constituting its S pole facing the face 32 of the magnet 25 constituting the S pole of the latter. Likewise, the branch 33 of the magnet 30 constituting its N pole is facing the face 34 of the magnet 25 constituting the N pole of the latter.

Thus, the magnetic field created by the magnet 30 tends to brake the magnet 25 when the latter approaches either one of the branches 31 or 33, with a force which increases as the magnet 25 gets closer to one of these branches.

Of course only one of these braking means may be used, or several of them could be used in combination, as needs be.

Figure 5A:
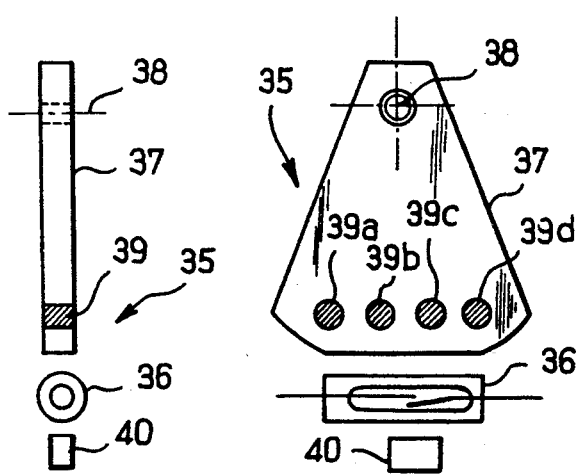
FIGS. 5A and 5B are diagrammatic views, respectively side-on and front-on of a second embodiment of a rotation detector in accordance with the invention.
Figure 5B:
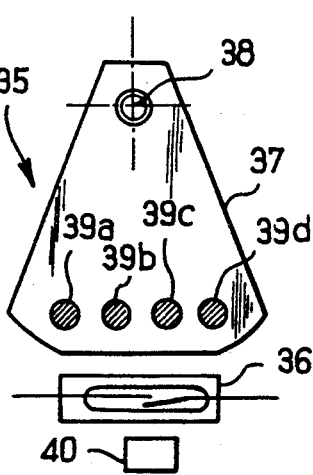

In the example represented in FIGS. 5A and 5B, the rotation detector 35 comprises a flexible strip switch 36 fastened to the steering wheel 1, and an element forming a pendulum 37, suspended from a spindle 38 itself fixed to the steering wheel, so as to turn freely about this spindle 38. The pendulum 37 carries at least one magnet 39 which passes in front of the flexible strip switch 36 when the steering wheel 1 turns with respect to its mean position, in which the spindle 38 is substantially horizontal.

In the example of FIG. 5B, the pendulum carries four magnets 39a, 39b, 39c, 39d which, each in turn, cause the switch 36 to close by passing in front of the latter when the steering wheel turns, which allows a finer analysis of this rotation.

A mass 40 of ferromagnetic metal is further placed on the other side of the flexible strip switch 36 with respect to the magnets 39, 39a, 39b, 39c, 39d so as to concentrate the lines of the magnetic field and enhance the precision of the signal given by the switch 36.

Figure 6:
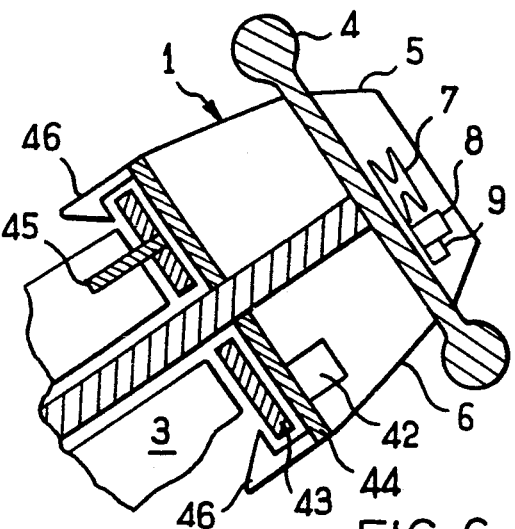
FIG. 6 is a view similar to FIG. 1, diagrammatically representing another embodiment of a rotation detector in accordance with the invention.

In the embodiment of FIG. 6, the steering wheel 41 comprises a device 42 which comprises a first flange 43 fixed to the sheath 3 perpendicularly to the steering column 2, and a second flange 44 fixed to the steering wheel 41 parallel to the first flange 43.

The first and second flanges 43, 44 carry conjugate respective means such that the means carried by the second flange 44 deliver at least one change of state signal by passing in front of the means carried by the first flange 43 during a rotation of the steering wheel 41.

In the example represented, the first flange 43 is a disk fixed to the end of the sheath 3 by any means, for example by a pin 45 which prevents the disk 43 from turning. The flange 44 is another disk fixed to the lower end of the steering wheel 41, and which carries two elastic pawls 46 capable of clipping into the disk 43 in order to prevent a recoil of the steering wheel 41 without hindering the latter's rotation.

Figure 7:
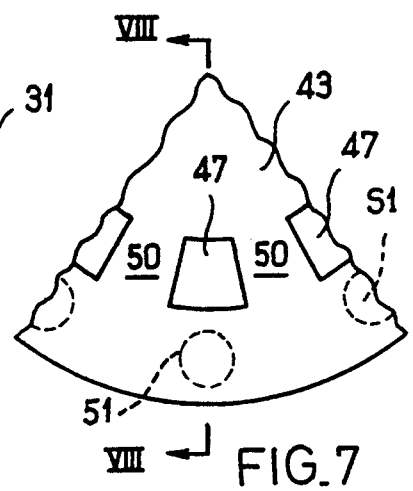
FIG. 7 is a partial front view of an element of the detector shown diagrammatically in FIG. 6.
Figures 8A, 8B:
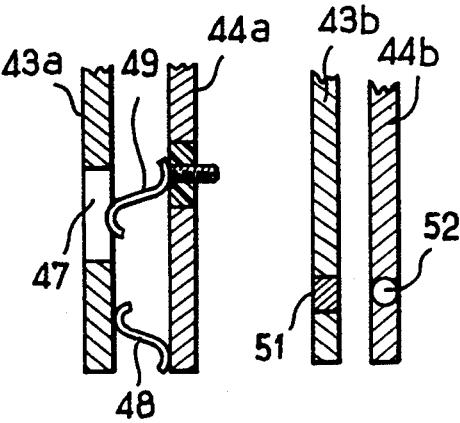
FIG. 8A is a partial diagrammatic sectional view along VIII—VIII of FIG. 7, of a first variant of the detector of FIG. 6.
FIG. 8B is a view similar to FIG. 8A of another variant of the detector of FIG. 6.

In the example-represented in FIG. 7, in solid line, and in FIG. 8A, the first disk 43a is made of metal and comprises openings 47 evenly distributed over one and the same circumference, and the second disk 44a comprises a first feeler 48 under voltage which permanently rubs against the first disk 43a and applies a voltage to it, as well as a second feeler 49 which is isolated with respect to the disk 43a and which comes into contact sometimes with the openings 47 sometimes with a metal part 50 lying between two adjacent openings 47. The feeler 49 therefore detects, in the event of the steering wheel 41 rotating, either the absence of voltage if it is in front of an opening 47, or the presence of voltage if it is in front of a metal part 50.

In the embodiment represented in dotted lines in FIG. 7 and in solid lines in FIG. 8B, the first disk 43b carries several magnets 51 distributed evenly over one and the same circumference, and the second disk 44b carries at least one flexible strip switch 52 which delivers a change of state signal each time it passes in front of one of the magnets 51.

Various embodiments of the device of the invention have thus been described, all of which are capable of being installed in a steering wheel and therefore make it possible to fit a novel steering wheel equipped with a protection airbag to any vehicle, even when the initial steering wheel of said vehicle does not comprise a revolving contact making it possible to supply current from the battery to the steering wheel.

According to the results of tests carried out by the Applicant Company, the device of the invention may have, under the conditions prevailing in a motor vehicle, a durability of at least five years, or even longer if the device comprises arming means. Such durability, which up until now was thought impossible to achieve, allows the device to be mounted in a place of the steering wheel which is difficult to access in order to respect the safety requirements, since the customer is guaranteed that it will not be necessary to dismantle the steering wheel of his vehicle for many years in order to change the cell of his arming device.

Of course, the invention is not limited to the embodiments which have just been described, and numerous modifications and changes may be made thereto without departing from the scope of the invention.

It is thus possible to provide several cells in series and/or in parallel as well as several capacitors in parallel, in order to power the electric ignitor.

It is possible to use any type of impact sensor, and any ignitor whatever meeting to the aforementioned requirements.

Of course any type of rotation detector whatever may be used or this detector may be replaced by another detector for detecting a use of the vehicle, for example an inertia detector of low inertia sensitive to the accelerations and decelerations of the vehicle.

Of course all the elements described hereinabove may be combined with one another or with other equivalent means.

Obviously, the invention is not limited to only airbag systems housed in the steering wheel of a motor vehicle, and the device of the invention may be used for any safety appliance triggered by a pyrotechnic member itself actuated by an electric ignitor, whether this be in the automobile field, for example for a seatbelt pretensioner, or in any other field, it being possible for the vehicle to be any machine. This device may thus be used for airbag systems housed, for example, in the doors of a vehicle, for protection against lateral impacts, or in the backrests of front seats, for protecting the back seat passengers, in order to avoid having to install bundles of conductor wires reaching to these places.

Likewise, in that which concerns the airbag capable of protecting the front passenger, it is easy to provide, on the electric arming circuit, a magnetic relay located close to the steering wheel and capable of being actuated by a magnet integral with the steering wheel: even if it comprises two electrical conductors going from the sheath of the steering wheel to the airbag, this electrical arming circuit, as for the one for the airbag housed in the steering wheel, remains perfectly automatic, reliable and secure.

We claim:

1. In an inflatable safety cushion device (7) for a vehicle, in particular an airbag, comprising an electrical arming device (19, 42) capable of detecting a dangerous situation and of very rapidly actuating a pyrotechnic gas generator (8) for triggering said safety cushion device (7), this electrical arming device (11, 19, 42) comprising a circuit (14) powered by a cell (12) and comprising, mounted in series, at least one sensor (10) for closing said circuit (14) when the dangerous situation is detected, and an electric ignitor (9) for being fired in order to actuate the pyrotechnic gas generator (8) under the action of the electrical current which flows in the circuit (14) as soon as the sensor (10) closes said circuit (14), the cell (12), the sensor (10) and the ignitor (9) being located together and being connected by a very short circuit (14); the improvement comprising arming means (20, 22, 35, 42; 21) for detecting a use of the vehicle in order automatically to arm said device (19, 42) as soon as it is detected that said vehicle is being used, and means (21a) for interrupting the armed state as soon as, for a predetermined length of time, no use of the vehicle has been detected.

2. The device as claimed in claim 1, wherein the arming means comprise a detector (20, 22, 35, 42) of rotation of a revolving shaft (2).

3. The device as claimed in claim 1, wherein the electric ignitor (9) is fired under the action of a current whose strength is less than approximately 0.8 A with a minimum duration of approximately 2 ms.

4. The device as claimed in claim 1, wherein the cell (12) is a lithium/thionyl chloride cell.

5. The device as claimed in claim 1, wherein the electric ignitor (9) requires less than approximately 2.2 mJ of firing energy supplied during approximately 2 ms in order to detonate.

6. The device (11, 19, 42) as claimed in claim 1, which further comprises means (15, 16) for monitoring the voltage of the cell (12).

7. The device (11, 19, 42) as claimed in claim 6, which further comprises warning means (17, 18) which are actuated by the monitoring means (15, 16) when the voltage of the cell (12) becomes less than a minimum predetermined threshold.

8. The device as claimed in claim 7, which further comprises means for actuating the warning means (17, 18) when the arming means (20, 22, 35, 42; 21) put said device in the armed state.

9. The device as claimed in claim 1, wherein the arming means comprise at least one magnet and at least one magnetic relay for opening or closing by passing in front of the magnet in the case of relative displacement with respect to the magnet(s).

10. The device as claimed in claim 2, wherein the arming means are fixed with respect to the revolving shaft (2) and comprise a flexible strip switch (23) inside a bulb (24) itself placed in the axis of an annular housing (26) inside which an annular magnet (25) of the same axis is free to move axially in one direction or the other by gravity thereby passing in front of said switch in the event of said revolving shaft (2) rotating.

11. The device as claimed in claim 10, wherein means (27, 28, 29, 30) are provided for braking the annular magnet (25) at the end of its travel.

12. The device as claimed in claim 2, wherein the arming means comprise a flexible strip relay fixed to the revolving shaft, and an element forming a pendulum revolving freely about its axis which is fixed with respect to said revolving shaft, said pendulum carrying at least one magnet in front of which the flexible strip relay passes when the revolving shaft revolves with respect to its mean position.

13. The device (42) as claimed in claim 2, with the shaft (2) revolving inside a sheath (3), which further comprises a first flange (43) fastened to the sheath (3) perpendicular to the axis of the revolving shaft (2), and a second flange (44) fastened to the revolving shaft (2) parallel to the first flange (43), the first and second flanges (43, 44) carrying conjugate respective means such that the means carried by the second flange (44) deliver at least one change of state signal by passing in front of the means carried by the first flange (43) during a rotation of the revolving shaft (2).

14. The device as claimed in claim 1, wherein said cushion is an airbag located in the steering wheel of a vehicle.

* * * * *